Patented Mar. 13, 1951

2,545,186

UNITED STATES PATENT OFFICE 2,545,186

NONAQUEOUS INSECTICIDAL EMULSIONS CONTAINING ORGANIC ESTERS OF PHOSPHOROUS ACIDS

Wallace J. Yates and Frank B. Folckemer, Martinez, and William A. Simanton, Berkeley, Calif., assignors to Shell Development Company, San Francisco, Calif., a corporation of Delaware No Drawing. Application June 2, 1947, Serial No. 751,970

5 Claims. (Cl. 167—42)

This invention relates to novel insecticidal compositions, and more specifically pertains to new insecticidal compositions which contain organic esters of the phosphorous acids as the active component or ingredient.

The value of organic esters of the phosphorous acids in combating insects and pests, such as aphids, mites, and the like, which commonly attack crops such as peas, cabbage, potatoes, apples, peaches, and the like, is well-known. For example, the use of hexaethyl tetraphosphate and tetraethyl pyrophosphate as the active component in compositions suitable for combating such insects and other pests has been taught. In employing these insecticidally active esters for combating insects and other pests, it is customary to prepare a concentrate of the ester in an organic solvent, such as xylene or toluene, and to incorporate therein a relatively large amount of an emulsifying agent, such as the alkaryl polyether alcohols. Immediately before application the ester concentrate is added to water and agitated, thereby forming an aqueous emulsion, wherein the active component may be dissolved in the water phase, and the aqueous emulsion is then applied to the insect or other pest infected localities. This procedure, however, requires that the emulsion be applied practically immediately after its preparation, since the ester, in the presence of water, undergoes hydrolysis whereby its toxic properties are lost. Even where the emulsion is applied immediately after its preparation, the process of hydrolysis continues after its application, and therefore in any event the insecticidal properties are rapidly lost, or at least materially decreased. The insecticidally active organic esters of the phosphorous acids may be dissolved in hydrocarbon oils with the aid of certain solutizers, but such compositions are generally unsuitable for application to plant and vegetable localities in that foliage is excessively damaged thereby. This damage is believed to be due to the absorption by the foliage of the hydrocarbon oil containing the organic ester of a phosphorous acid dissolved therein, which ester then causes damage to the foliage.

It is, therefore, an object of this invention, to provide novel non-aqueous insecticidal compositions containing an organic ester of a phosphorous acid as the active ingredient. Another object of this invention is to provide novel insecticidal compositions containing an ester of a phosphorous acid which may be stored without loss of its toxic properties. A still further object of this invention is to provide a non-aqueous insecticidal composition containing an organic ester of a phosphorous acid which does not adversely affect foliage which it may contact. Other objects and their attainment in accordance with the present invention will appear hereinafter.

It has now been discovered that relatively stable non-aqueous emulsions of the insecticidally active polyalkyl esters of the polyphosphorous acids in hydrocarbon oils may be prepared, which emulsions possess the characteristics and properties desirable in insecticidal compositions.

The non-aqueous emulsions of the insecticidally active polyalkyl esters of the polyphosphorous acids in hydrocarbon oils, in accordance with the present invention, may be prepared in the presence of a minor quantity of a suitable emulsifying agent such as a higher molecular weight organic ester of a phosphorous acid, and in the substantial absence of water, as hereinafter fully described. Such emulsions, wherein there is substantially no water, are surprisingly stable, need not be applied immediately after preparation, and the loss of toxicity through hydrolysis of the insecticidally active ester is completely eliminated. The compositions of the present invention do not adversely affect foliage to which they may be applied, probably due to the inability of the foliage to absorb sufficient quantities of the insecticidally active esters of polyphosphorous acids to cause damage or injury to the foliage when the said esters are in emulsified form. The compositions of the present invention, therefore, completely obviate the objections inherent in the use of the heretofore known aqueous emulsions or the solutions of the classes already referred to.

As above stated, the emulsion compositions of the present invention contain as an emulsifying agent a minor quantity of a higher molecular weight organic ester of a phosphorous acid, which esters are commonly soluble in hydrocarbon oils. By the term "higher molecular weight organic ester of a phosphorous acid," as used herein, is meant the mono or poly organic esters of a phosphorous acid wherein the ratio of the total number of carbon atoms per molecule to the total number of phosphorus atoms per molecule is at least 12. The organic groups may contain other atoms or groups connected therein or attached thereto, as hereinafter fully described. Such esters may be represented by the general structural formula

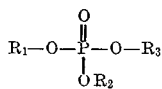

wherein $R_1$ represents an aliphatic or cycloaliphatic group, and wherein $R_2$ and $R_3$ represent the same or different atoms or groups and which may be hydrogen atoms or aliphatic or cycloaliphatic groups. It is essential, however, as above stated, that the ratio of the number of carbon atoms of the organic groups to the number of phosphorus atoms be at least 12. In this case, where there is one phosphorus atom, the total number of carbon atoms in the organic groups represented by $R_1$, $R_2$ and $R_3$ must be at least 12, which 12 carbon atoms may be distributed between the three organic groups in any ratio. For example, $R_1$ may contain 12 (or more) carbon atoms, while $R_2$ and $R_3$ represent hydrogen atoms, or $R_1$, $R_2$ and $R_3$ may each contain 4 (or more) carbon atoms. It is preferred, however, to employ esters wherein one of the organic groups contains a predominate number of the carbon atoms relative to the other organic groups present, and it is further preferred to employ esters wherein either $R_2$ or $R_3$ represents a hydrogen atom, i. e., it is desirable to have one hydroxyl group attached to the phosphorus atom. Preferred esters are those wherein one of the organic groups has an ester group attached therein, the carbon atoms of the ester portion contributing to the total number of carbon atoms thereof; such esters may be represented by the general structural formula

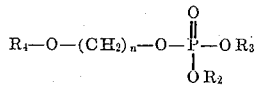

wherein $R_4$ represents a saturated or unsaturated fatty acid acyl radical, $n$ is an integer of a value such that the total number of carbon atoms in the molecule will be at least 12, and $R_2$ and $R_3$ represent the same atoms or groups as defined for $R_2$ and $R_3$ in the preceding structural formula. A further preferred ester is one wherein a second ester group is attached to a carbon atom in the chain represented by $-(CH_2)_n-$ in the preceding formula.

Especially preferred esters of the present invention are the higher molecular weight organic esters of a phosphorous acid wherein two ester groups are attached to different carbon atoms of the same organic group which in turn is attached to a phosphorus atom, and wherein a nitrogen atom is attached in a different organic group. The phosphatides are illustrative of the last named preferred group of higher molecular weight organic esters of the phosphorous acids.

By the term "phosphatide," as used herein, is meant those substances widely distributed throughout the animal and vegetable kingdoms, but which may be prepared synthetically, which on hydrolysis yield fatty acids, a nitrogenous base, phosphoric acid, and usually glycerol, and which are also known as "phospholipins," and "phospholipids." As illustrative of the phosphatides may be mentioned the lecithins, cephalin and sphingomyelin. The lecithins, which are preferred materials of the present invention, are esters of oleic, palmitic, stearic, or other saturated or unsaturated fatty acid, with glycerophosphoric acid and choline, and may be natural or synthetic. Lecithins may be represented by the following structural formula, which specifically represents an alpha-lecithin:

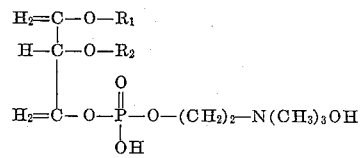

wherein $R_1$ and $R_2$ represent similar or dissimilar, saturated or unsaturated, fatty acid acyl radicals. In this illustration the ratio of the number of carbon atoms per molecule to the number of phosphorus atoms per molecule will usually vary from about 40 to about 50, depending on the number of carbon atoms in the fatty acid acyl radicals. Beta-lecithin is similar in structure and composition except that it is derived from glyceryl-beta-phosphate instead of glyceryl-alpha-phosphate; cephalin is similar except that it has cholamine (hydroxy-ethylamine) united with the glyceryl-phosphate radical instead of choline.

The above-described higher molecular weight organic esters of the phosphorous acids may be prepared by methods known to the art, or may be obtained from synthetic sources. The phosphatides, which are preferred esters for employment in the present invention, may be obtained by synthetic preparation or from natural sources by procedures known to the art. For example, phosphatides may be obtained from animal or vegetable sources, such as egg-yolks, brains, and the like, and from many plant seeds, such as the soybean, by simple extraction procedures. The commercial phosphatides give excellent results when employed in the compositions of the present invention, the usual impurities therein exerting no adverse effect on the compositions or their preparation. The phosphatide may be bleached, for example with hydrogen peroxide, or otherwise treated, for example for purification purposes, and good results obtained therewith. In extracting phosphatides from natural sources, mixtures of phosphatides are usually obtained, such as mixtures of alpha-lecithin, beta-lecithin, and cephalin, and such mixtures give excellent results when employed in accordance with the present invention.

In preparing the compositions of the present invention, it is preferred to prepare first a concentrate of the active polyalkyl ester of a polyphosphorous acid in an organic solvent therefor, i. e., a relatively concentrated solution thereof. Suitable solvents include xylene, toluene, benzene, orthodichlorobenzene, the alkyl naphthalenes, acetone, carbon tetrachloride, chloroform, ethyl acetate, butyl acetate, and the like. The concentration of the active ester in the solvent may be any desired or convenient value, and may usually be about 60%, though of course lower or higher concentrations may be used. The concentrate containing the active ester, so dissolved in an organic solvent may be stored for considerable periods of time without noticeably adversely affecting the toxic properties of the said ester. At a convenient time before application, the concentrate is added to a hydrocarbon oil such as kerosene, containing dissolved therein a minor portion of a higher molecular weight organic ester of a phosphorous acid, such as a phosphatide, with concurrent or subsequent agitation, to form an emulsion of the active organic ester of a phosphorous acid therein. The quantity of the said ester incorporated in the hydrocarbon oil may be varied considerably, but may advantageously be from about 0.1% to about 10% by weight of the final emulsion but of course smaller or greater quantities may be employed whenever necessary or desirable. Since water is not present to hydrolyze the insecticidally active ester, the emulsion may be prepared and stored for appreciable times before its application. However, if the emulsion is stored prior to use, it is usually desirable to reagitate before use, and therefore it is advantageous to apply the emulsion soon after its initial preparation. It is, of course, unnecessary to add the higher molecular weight ester to the hydrocarbon oil prior to emulsification; it may be added at any point in the preparation of the emulsion. For example, it may be added to the concentrate, usually in a quantity such that the ratio of higher molecular weight ester to the active ester is from about 9 to 1 to about 1 to 9 parts by weight, and so stored as part of the concentrate, or to the concentrate immediately before emulsification, or to the hydrocarbon oil before or during the concentrate addition. It has been found advantageous to incorporate the higher molecular weight ester in the hydrocarbon oil and so store until the concentrate is emulsified therein; this is usually the preferred procedure.

Another important modification of the present invention is the direct emulsification of a polyalkyl ester of a polyphosphorous acid in a light oil distillate in the presence of a minor quantity of a higher molecular weight ester, as herein defined, i. e., the organic solvent for the said active ester may be omitted and good results obtained. Here also the higher molecular weight ester may be added at any desired point in the preparation, and may advantageously be incorporated in the hydrocarbon oil and the active ester added thereto, but the higher molecular weight ester may be incorporated with the said active ester, usually in quantities such that the ratio of the higher molecular weight ester to the said active ester is from about 9 to 1 to about 1 to 9 parts by weight, respectively, where desirable.

As illustrative of the present invention, hexaethyl tetraphosphate, a preferred active ester of the present invention, may be dissolved in an organic solvent, such as xylene or toluene, to produce a concentrate of about 60% concentration of hexaethyl tetraphosphate. The so-formed concentrate is then added, with concurrent or subsequent agitation, to a hydrocarbon oil, such as kerosene, containing incorporated therein a minor portion of a higher molecular weight organic ester of a phosphorous acid. The quantity of the higher molecular weight ester employed may be varied considerably and good results obtained therewith, but in usual applications the quantity may advantageously be such that it will constitute from about 0.1% to about 10% by weight of the final emulsion. The resulting emulsion may then be applied to the insect or other pest infested localities by methods known to the art, such as by means of a power or hand operated atomizer.

In a substantially identical manner other active polyalkyl esters of the polyphosphorous acids may be employed as the insecticidally active component in the compositions of the present invention. Preferred esters include hexaethyl tetraphosphate, as above described, and tetraethyl pyrophosphate. Other esters of the phosphorous acids which may be employed in accordance with the present invention include hexamethyl tetraphosphate, hexapropyl tetraphosphate, tetramethyl pyrophosphate, tetrapropyl pyrophosphate, triethylpyrophosphite, and the like, and their homologues. The polyalkyl esters of the polyphosphorous acids containing one or more cycloaliphatic groups, or substituted cycloaliphatic groups, may also be employed in accordance with the present invention. It is preferred to employ the normal esters, i. e., esters which are completely esterified, as the active component. The esters may also contain substituent elements or radicals on the alkyl or cycloaliphatic groups, such as halogen atoms, nitro and amino groups, and the like. It is essential, however, for the successful employment of the present invention, that the ratio of the total number of carbon atoms per molecule to the total number of phosphorus atoms per molecule be less than 12, since, as has been found, emulsions of satisfactory properties cannot be prepared in accordance with the present invention if this ratio be exceeded.

The hydrocarbon oils, and especially the light oil distillates derived from petroleum consisting chiefly of aliphatic constituents, are generally applicable in compounding the insecticidal compositions of the present invention. The hydrocarbon oils boiling in the kerosene distillate range of from about 150° C. to about 350° C., and preferably from about 150° C. to about 300° C., are especially suitable.

The esters employed as the active component in the compositions of the present invention may be prepared by methods known to the art. In general, an appropriate acid of phosphorus, such as pyrophosphoric acid, or tetraphosphoric acid may be esterified with an alcohol such as ethyl alcohol. Hexaethyl tetraphosphate, a preferred organic ester of a phosphorous acid for employment in the present invention, may be prepared by the reaction between phosphorus oxychloride and triethyl phosphate.

The presence of emulsifiers commonly used to prepare aqueous emulsions of the organic esters of the phosphorous acids do not adversely affect the compositions of the present invention or interfere with their preparation, but they exert no beneficial action in forming the compositions of the present invention. For example, the alkaryl polyether alcohols, nonaethyleneglycol oleate, tricresyl phosphate, glyceryl monooleate, cyclohexylamine oleate, and the like, which may be employed to form aqueous emulsions of the organic esters of the phosphorous acids, are practically completely useless in the formation of the oil emulsions of the present invention.

The following examples illustrate the present invention, which is not to be considered as limited thereby.

*Example I*

5 parts by volume of a concentrate comprising 60% by weight of hexaethyl tetraphosphate, 35% by weight of xylene, and 5% by weight of emulsifiers useful in the preparation of aqueous emulsions, was added, with agitation to 95 parts by volume of a light oil distillate containing 3 parts by volume of lecithin. An emulsion of excellent characteristics for insecticidal applications was obtained.

In a substantially identical manner, an emulsion of excellent characteristics may be prepared employing tetraethyl pyrophosphate in place of the hexaethyl tetraphosphate.

The above process was repeated using, in place of lecithin, equivalent quantities of nonaethyleneglycol oleate, tricresyl phosphate, glyceryl monooleate, cyclohexylamine oleate, aluminum naphthenate, various alkaryl polyether alcohols, and other similar materials. None of these materials gave an emulsion possessing characteristics suitable for employment in accordance with the present invention.

*Example II*

Emulsions were prepared by adding 5 parts by volume of a concentrate containing about 60% by weight hexaethyl tetraphosphate, 35% by weight xylene and 5% by weight of emulsifiers suitable for the preparation of water emulsions, to 95 parts by volume of a light oil distillate boiling between about 200° C. and 350° C., in the presence of various quantities of lecithin. The amounts of phase separation, measured at various time intervals, were as shown:

| Lecithin Added, grams | Phase Separation, parts | | | |
|---|---|---|---|---|
| | 1 minute | 2 minutes | 4 minutes | 5 minutes |
| 0.0 | 0.1 | 0.3 | 1.30 | 2.30 |
| 0.5 | 0.05 | 0.15 | 0.35 | 0.40 |
| 1.0 | 0.05 | 0.08 | 0.15 | 0.25 |
| 2.0 | trace | trace | 0.05 | 0.10 |
| 3.0 | trace | trace | 0.05 | 0.08 |

These data demonstrate the good stability of the emulsion compositions of the present invention, and indicate that good results are obtained with from about 0.1% to about 3% lecithin added, and that more may be employed to advantage in some instances, but that appreciably greater quantities, say above about 10%, will not greatly increase the stability over that obtained with about 3%.

*Example III*

Emulsions of hexaethyl tetraphosphate in hydrocarbon oils were prepared from concentrates of various compositions. The compositions and quantity of the concentrate employed, together with the data obtained, are shown in the following table. In each case, the light oil distillate contained substantially 1 gram per 100 cc. of solution of lecithin. The figures of the table are in parts by weight unless otherwise stated.

| Test Number | 1 | 2 | 3 | 4 | 5 | 6 | 7 |
|---|---|---|---|---|---|---|---|
| Hexaethyl tetraphosphate | 60 | 60 | 60 | 60 | 60 | 60 | 60 |
| Xylene | 35 | 20 | | | 20 | 20 | 20 |
| Toluene | | | 35 | | | | |
| n-Butyl acetate | | | | 35 | | | |
| Emulsifier [1] | 5 | 20 | 5 | 5 | 20 | 20 | 20 |
| Parts by volume of concentrate used | 5 | 5 | 5 | 5 | 3 | 2 | 1 |
| Parts by volume of light oil distillate used | 95 | 95 | 95 | 95 | 97 | 98 | 99 |
| Phase Separation After: | | | | | | | |
| 1 minute | trace | 0.05 | trace | trace | trace | trace | trace |
| 2 minutes | 0.05 | 0.15 | trace | 0.15 | trace | trace | trace |
| 3 minutes | 0.10 | 0.35 | 0.05 | 0.40 | trace | trace | trace |
| 5 minutes | 0.25 | 0.90 | 0.15 | 0.85 | trace | trace | trace |

[1] Emulsifiers commonly employed in the preparation of aqueous emulsions.

This example demonstrates that various organic solvents may be employed for the preparation of the concentrate of the active ester of the polyphosphorous acids for subsequent compounding with a light oil distillate and that emulsifiers commonly used to prepare aqueous emulsions do not adversely affect the composition.

In a substantially identical manner as described in the above examples other higher molecular weight organic esters of phosphorous acids, as hereinbefore defined, may be employed to give emulsions of excellent characteristics in accordance with the present invention.

The application of the compositions of the present invention, as hereinbefore stated, to the insect infested localities may be performed by the usual methods for dispensing fluid insecticides, such as by means of a hand or power atomizer. The optimum concentration of the active ester to incorporate in the oil will of course vary according to the particular equipment used for application, and the insect or pest to be combated, but usually concentrations of from about 0.5% to about 10% are suitable, though lower or higher concentrations may be employed where necessary or desirable.

We claim as our invention:

1. A non-aqueous mineral spray oil insecticidal composition comprising a light mineral spray oil, between about 0.5% and about 10% of hexaethyl tetraphosphate, and between about 0.1% and about 10% of lecithin, said hexaethyl tetraphosphate being substantially insoluble and predominantly undissolved in said oil but emulsified therein, said lecithin being dissolved in said oil.

2. A non-aqueous insecticidal composition comprising a light mineral spray oil, between about 0.5% and about 10% of tetraethyl pyrophosphate, and between about 0.1% and about 10% of lecithin, said tetraethyl pyrophosphate being substantially insoluble and predominantly undissolved in said oil but emulsified therein, said lecithin being dissolved in said oil.

3. A non-aqueous insecticidal composition comprising a light, essentially paraffinic, mineral spray oil, between about 0.1 and about 10% of lecithin dissolved in said oil, and a toxic concentration of an insecticidally active polyalkyl ester of a polyphosphorous acid having a ratio of carbon atoms to phosphorus atoms less than 12, said ester being substantially insoluble and predominantly undissolved in said oil but emulsified therein.

4. A non-aqueous insecticidal composition comprising a light mineral spray oil, between about 0.1 and about 10% of a phosphatide emulsifier dissolved in said oil, said phosphatide having a ratio of carbon atoms to phosphorus atoms of at least 12, and a toxic concentration of an insecticidally active polyalkyl ester of a polyphosphorous acid having a ratio of carbon atoms to phosphorus atoms less than 12, said ester being substantially insoluble and predominantly undissolved in said oil but emulsified therein.

5. A non-aqueous insecticidal composition comprising a light mineral spray oil, between about 0.1% and about 10% of a surface-active organic ester of a phosphorous acid dissolved in said oil, said ester having a ratio of carbon atoms to phosphorus atoms of at least 12, and a toxic concentration of an insecticidally active polyalkyl ester of a polyphosphorous acid having a ratio of carbon atoms to phosphorus atoms less than 12, said latter ester being substantially insoluble and predominantly undissolved in said oil but emulsified therein.

WALLACE J. YATES.
FRANK B. FOLCKEMER.
WILLIAM A. SIMANTON.

REFERENCES CITED

The following references are of record in the file of this patent:

UNITED STATES PATENTS

| Number | Name | Date |
|---|---|---|
| Re. 20,869 | Bousquet | Oct. 4, 1938 |
| 1,748,675 | Lommel | Feb. 25, 1930 |
| 1,938,864 | Rewald | Dec. 12, 1933 |
| 2,006,227 | Bousquet | June 25, 1935 |
| 2,080,299 | Benning | May 11, 1937 |
| 2,132,013 | Blount | Oct. 4, 1938 |
| 2,143,639 | Caprio | Jan. 10, 1939 |
| 2,271,409 | Thurman | Jan. 27, 1942 |
| 2,304,156 | Englemann | Dec. 8, 1942 |
| 2,336,302 | Schrader | Dec. 7, 1943 |
| 2,402,703 | Woodstock | June 25, 1946 |
| 2,407,041 | Thurman | Sept. 3, 1946 |

FOREIGN PATENTS

| Number | Country | Date |
|---|---|---|
| 505,983 | Great Britain | Nov. 16, 1938 |
| 476,293 | Germany | May 13, 1929 |

OTHER REFERENCES

Bennett: Practical Emulsions, pages 21, 22, Chemical Pub. Co., 1943.

West: DDT, the Synthetic Insecticide, Chapman and Hall, Ltd., London, May 1946, page 51.

Hall: Insecticides, Insect Repellents, Rodenticides and Fungicides. Office of the Publication Board, Department of Commerce, Jan. 11, 1946, page 10.

Chemical and Engineering News, Sept. 10, 1945, pages 1520, 1521.

Cupples: A List of Commercially Available Detergents, Wetting, Dispersing and Emulsifying Agents, Department of Agriculture Publication E-504, June 1940, pages 1, 2, and 56.

Jones et al.: J. Econ. Entomology, vol. 38, No. 2, pp. 207, 208, 209, 210.